(12) United States Patent
Kobata et al.

(10) Patent No.: US 7,209,704 B2
(45) Date of Patent: Apr. 24, 2007

(54) WIRELESS HEADPHONE APPARATUS AND WIRELESS HEADPHONE SYSTEM

(75) Inventors: Keiichi Kobata, Machida (JP); Tetsuya Tsuruoka, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 447 days.

(21) Appl. No.: 10/764,851

(22) Filed: Jan. 26, 2004

(65) Prior Publication Data

US 2004/0156522 A1    Aug. 12, 2004

(30) Foreign Application Priority Data

Jan. 31, 2003 (JP) ............................ 2003-023986
Feb. 21, 2003 (JP) ............................ 2003-044574

(51) Int. Cl.
*H04B 5/00* (2006.01)
*G01J 5/00* (2006.01)

(52) U.S. Cl. ................. 455/41.1; 455/345; 455/151.2; 250/338.1

(58) Field of Classification Search ................ 359/528, 359/189, 193, 194; 455/569.2, 41.1, 41.2, 455/41.3, 151.2, 345, 566, 575.1, 91.1; 250/338.1, 250/208.2; 398/202, 212; 381/370
See application file for complete search history.

(56) References Cited

U.S. PATENT DOCUMENTS 3,609,570 A * 9/1971 Gould ......................... 455/91
4,222,880 A * 9/1980 Baur et al. .................. 398/212
5,095,382 A * 3/1992 Abe ............................ 398/202
5,099,359 A * 3/1992 Hrycin et al. ............. 250/338.1
5,130,546 A * 7/1992 Keeler ....................... 250/338.1
5,819,167 A   10/1998 Lawrence
5,999,299 A * 12/1999 Chan et al. ................. 398/202
6,490,439 B1 * 12/2002 Croft et al. ................. 455/90.1
6,614,024 B1 * 9/2003 Oei et al. ................. 250/338.1
6,871,986 B2 * 3/2005 Yamanaka et al. .......... 362/490
7,039,326 B1 * 5/2006 Chung ........................ 398/202
2004/0204125 A1 * 10/2004 Messel et al. ............ 455/575.1
2005/0037815 A1 * 2/2005 Besharat et al. ............ 455/566

FOREIGN PATENT DOCUMENTS

EP          0 613 320 A2     8/1994
JP          2005-017124   *  12/2004

* cited by examiner

*Primary Examiner*—Lana Le
(74) *Attorney, Agent, or Firm*—Pearne & Gordon LLP

(57) ABSTRACT

Herein disclosed is a wireless headphone apparatus, comprising: a plurality of light signal receiving units each for receiving a light signal to produce an electric signal having a signal level; a plurality of light signal limiting units respectively connected with the plurality of light signal receiving units in one to one relationship, each of the light signal limiting units operative to allow only an electric signal having a signal level lower than a predetermined threshold value to pass therethrough and delete an electric signal having a signal level equal to or greater than the predetermined threshold value; a signal synthesizing unit for synthesizing the electric signals passed through the light signal limiting units to produce a synthesized electric signal; and speaker means for outputting a sound in response to the synthesized electric signal.

9 Claims, 4 Drawing Sheets

WIRELESS HEADPHONE APPARATUS AND WIRELESS HEADPHONE SYSTEM

BACKGROUND OF THE INVENTION

1. Field of the Invention

The present invention relates to a wireless headphone system, and more particularly to an infrared signal emitting apparatus for emitting an infrared signal and wireless headphone apparatus for outputting an audio sound in response to the infrared signal. The infrared signal emitting apparatus and the wireless headphone apparatus are to be used in a vehicle or in the open air.

2. Description of the Related Art

Up until now, there have been provided a wide variety of wireless headphone systems comprising an audio apparatus and a wireless headphone apparatus, which can be used in, for example, a vehicle for the purpose that a passenger sitting in a rear seat can listen to a radio or a CD without disturbing the driver or passengers sitting in front seats.

One typical example of the conventional wireless headphone system is shown in FIG. 6 as comprising an audio apparatus 70 and a conventional wireless headphone apparatus 80. The audio apparatus 70 comprises a signal emitting unit 71 for emitting an infrared signal. The conventional wireless headphone apparatus 80 comprises an infrared signal receiving unit 81 for receiving the infrared signal transmitted from the signal emitting unit 71 of the audio apparatus 70 to output an audio signal. As shown in FIG. 6, the infrared signal receiving unit 81 receives extraneous light in addition to the infrared signal emitted from the signal emitting unit 71. This means that the audio signal outputted by the infrared signal receiving unit 81 contains a noise component caused by the extraneous light. The conventional wireless headphone apparatus 80 further comprises a noise filtering circuit 82 for eliminating the noise component caused by the extraneous light to output a filtered audio signal, an amplifier 83 for amplifying the filtered audio signal to output an amplified audio signal, and a speaker 84 for outputting a sound in response to the amplified audio signal.

The conventional wireless headphone system thus constructed as previously mentioned, however, encounters a drawback that the conventional wireless headphone apparatus 80 tends to receive sunlight, for example, coming through a window of the vehicle. The noise component caused by the sunlight cannot be eliminated by the noise filtering circuit 82 because of the fact that the sunlight includes strong infrared radiation. This results in the fact that the noise filtering circuit 82 outputs an audio signal with noise component caused by the sunlight and the speaker 84 outputs a sound with large noises.

In the vehicle, a passenger sitting in a left seat tends to receive sunlight from a left window, while a passenger sitting in a right seat tends to receive sunlight from a right window. This means that the infrared signal receiving unit 81 placed on the left side receives an infrared signal with less extraneous light while the infrared signal receiving unit 81 placed on the right side receives an infrared signal with sunlight in the case that the passenger sits in the right seat. The infrared signal receiving unit 81 placed on the right side, on the other hand, receives an infrared signal with less extraneous light while the infrared signal receiving unit 81 placed on the left side receives an infrared signal with sunlight in the case that the passenger sits in the left seat. This leads to the fact that the that the infrared signal receiving unit 81 placed on one side tends to receive an infrared signal with sunlight although the infrared signal receiving unit 81 placed on the other side may receive an infrared signal with less extraneous light.

SUMMARY OF THE INVENTION

It is, therefore, an object of the present invention to provide a wireless headphone system which can prevent noises caused by sunlight from being outputted.

It is another object of the present invention to provide a wireless headphone apparatus which can prevent noises caused by sunlight from being outputted.

In accordance with a first aspect of the present invention, there is provided a wireless headphone apparatus, comprising: a plurality of light signal receiving units each for receiving a light signal to produce an electric signal having a signal level; a plurality of light signal limiting units respectively connected with the plurality of light signal receiving units in one to one relationship, each of the light signal limiting units operative to allow only an electric signal having a signal level lower than a predetermined threshold value to pass therethrough and delete an electric signal having a signal level equal to or greater than the predetermined threshold value; a signal synthesizing unit for synthesizing the electric signals passed through the light signal limiting units to produce a synthesized electric signal; and speaker means for outputting a sound in response to the synthesized electric signal.

In the aforementioned wireless headphone apparatus, the light signal receiving units may be constituted by at least two light signal receiving units. The speaker means may be constituted by at a right speaker and a left speaker. Furthermore, the light signal receiving units may be placed in the vicinity of the right speaker and the left speaker. The speaker means may be further constituted by a right speaker, a left speaker, and a housing having a first axis passing through the right speaker and the left speaker, at least one of the light signal receiving units may be placed on a second axis substantially perpendicular to the first axis and passing through a middle point of the first axis in equidistantly spaced relationship with the right speaker and the left speaker. The speaker means may be further constituted by a right speaker, a left speaker, and a housing having a first axis passing through the right speaker and the left speaker, and a second axis substantially perpendicular to the first axis and passing through a middle point of the first axis in equidistantly spaced relationship with the right speaker and the left speaker, and the light signal receiving units may be opposing to each other across a plane passing through the first axis and the second axis.

In accordance with a second aspect of the present invention, there is provided a wireless headphone system, comprising: a light signal emitting apparatus for emitting a light signal; and the aforementioned wireless headphone apparatus, in which each of the plurality of light signal receiving units of the wireless headphone apparatus is operative to receive the light signal emitted by the light signal emitting apparatus. In the aforementioned wireless headphone system, the light signal emitting apparatus may be provided in a vehicle, and each of the light signal receiving units of the wireless headphone apparatus may be operative to receive the light signal emitted by the light signal emitting apparatus in the vehicle. The light signal emitting apparatus may be provided on a ceiling of the vehicle.

BRIEF DESCRIPTION OF THE DRAWINGS

The present invention and many of the advantages thereof will be better understood from the following detailed description when considered in connection with the accompanying drawings, wherein.

DESCRIPTION OF THE PREFERRED EMBODIMENT

The following description will be directed to a preferred embodiment of the wireless headphone system according to the present invention with reference to FIGS. 1 to 5.

The construction of the wireless headphone system according to the present invention will now be described in detail hereinafter with reference to FIG. 1.

Figure 1:
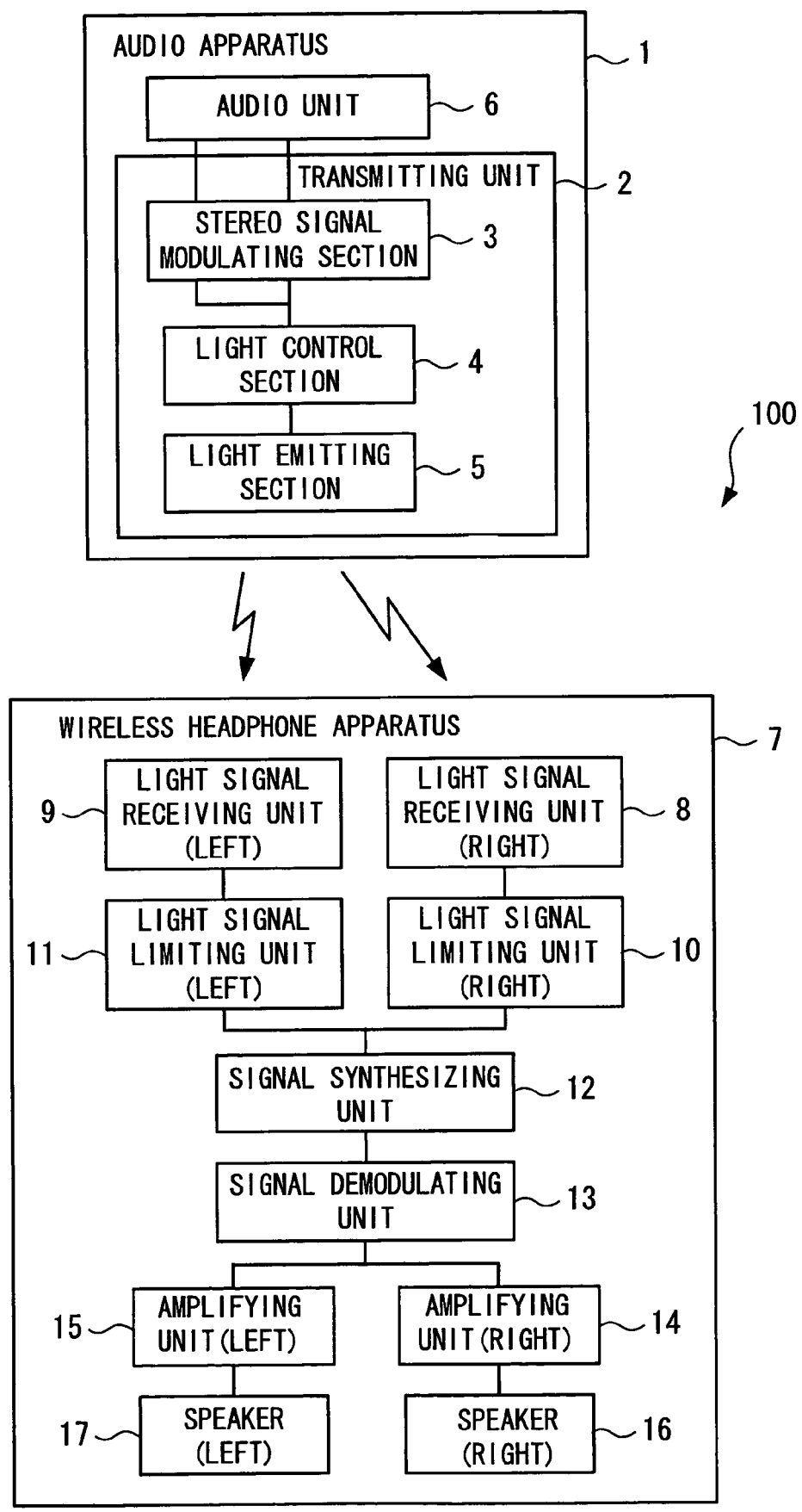
FIG. 1 is a block diagram showing a preferred embodiment of the wireless headphone system according to the present invention.
Figure 2:
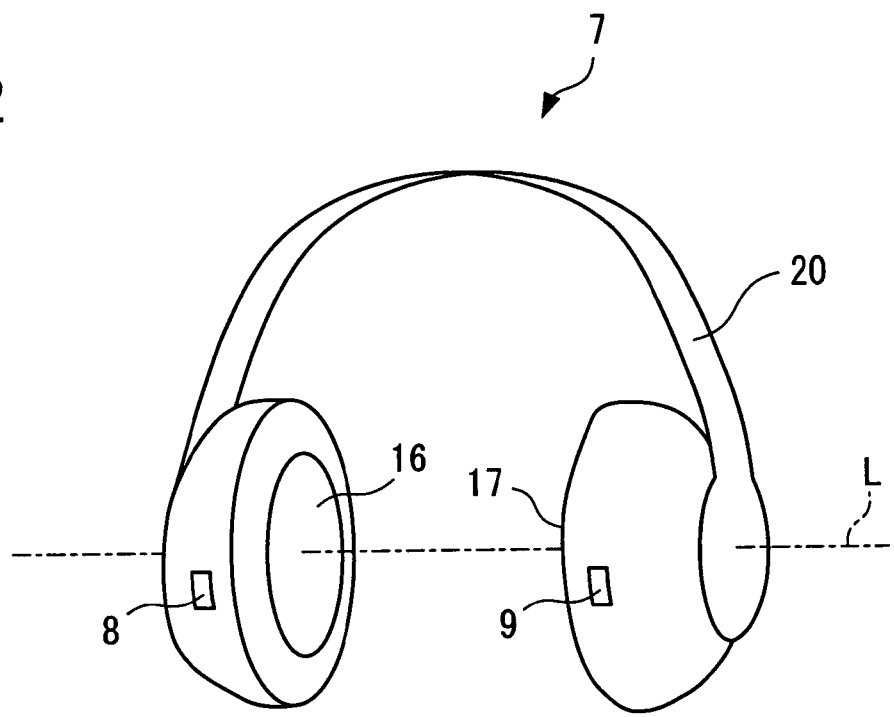
FIG. 2 is a perspective view of a wireless headphone apparatus forming part of the wireless headphone system shown in FIG. 1 showing that light signal receiving units are placed in the vicinity of headphone speakers.

Referring to FIG. 1 of the drawings, there is shown a wireless headphone system 100, comprising an audio apparatus 1 and a wireless headphone apparatus 7.

The audio apparatus 1 comprises an audio unit 6, such as for example a radio, a CD player, and the like, for producing an electric audio signal, a transmitting unit 2 for emitting a light signal on the basis of the electric audio signal produced by the audio apparatus 1, and an operating unit, not shown in FIG. 1, for operating the audio unit 6 to have the audio unit 6 play a CD or operate a radio. The wireless headphone apparatus 7 is adapted to receive the light signal from the transmitting unit 2 to output an audio sound. In the present embodiment, the electric signal produced by the audio unit 6 is an electric audio signal, hereinlater referred to simply as an "audio signal", and the light signal transmitted from the transmitting unit 2 is an infrared signal, hereinlater referred to simply as a "light signal". The audio unit 6 and the operating unit are provided in, for example, an instrument panel of the vehicle and the transmitting unit 2 is provided, for example, on a ceiling of the vehicle.

The transmitting unit 2 comprises a stereo signal modulating section 3 for amplifying and frequency-modulating the audio signal produced by the audio unit 6, a control section 4 for controlling the whole operation of the transmitting unit 2 on the basis of the audio signal amplified and frequency-modulated by the stereo signal modulating section 3, and a light emitting section 5, having a light-emitting diode, for emitting a light signal. The control section 4 is operative to control the light emitting section 5 to have the light emitting section 5 emit a light signal. The strength of the light signal emitted by the light emitting section 5 is adjusted by the control section 4 in accordance with the audio signal amplified and frequency-modulated by the stereo signal modulating section 3. The transmitting unit 2 constitutes a light signal emitting apparatus according to the present invention.

The wireless headphone apparatus 7 comprises a plurality of light signal receiving units. Each of the light signal receiving units is adapted to receive the light signal emitted by the light emitting section 5 of the transmitting unit 2 to produce an electric audio signal having a signal level. In the present embodiment, the wireless headphone apparatus 7 comprises two light signal receiving units, viz., a light signal receiving unit (right) 8 and a light signal receiving unit (left) 9 respectively in the vicinity of the right speaker 16 and the left speaker 17.

The wireless headphone apparatus 7 further comprises a plurality of light signal limiting units respectively connected with the light signal receiving units in one to one relationship. Each of the light signal limiting units is operative to allow only an electric signal having a signal level lower than a predetermined threshold value to pass therethrough and delete an electric signal having a signal level equal to or greater than the predetermined threshold value. In the present embodiment, the wireless headphone apparatus 7 comprises a light signal limiting unit (right) 10 and a light signal limiting unit (left) 11 respectively connected with the light signal receiving unit (right) 8 and a light signal receiving unit (left) 9 in one to one relationship as shown in FIG. 1.

The wireless headphone apparatus 7 further comprises a signal synthesizing unit 12 for synthesizing the electric signals passed through the light signal limiting units 10 and 11 to produce a synthesized electric signal, a signal demodulating unit 13 for demodulating the synthesized electric signal produced by the signal synthesizing unit 12, an amplifying unit (right) 14 and an amplifying unit (left) 15 each for amplifying the synthesized electric signal demodulated by the signal demodulating unit 13, and speaker means constituted by a right speaker 16 and a left speaker 17 for outputting a sound in response to the synthesized electric signals respectively amplified by the amplifying unit (right) 14 and the amplifying unit (left) 15. In reality, the wireless headphone apparatus 7 may further comprise a noise filtering circuit intervening between the signal synthesizing unit 12 and the signal demodulating unit 13, for filtering the synthesized electric signal produced by the signal synthesizing unit 12, but the noise filtering circuit will be omitted from description in the present embodiment for simplicity and better understanding.

In the wireless headphone apparatus 7 thus constructed, one of the light signal limiting unit (right) 10 and the light signal limiting unit (left) 11 can allow the audio signal to pass therethrough although the other one of the light signal limiting unit (right) 10 and the light signal limiting unit (left) 11 may delete the audio signal, and the right speaker 16 and the left speaker 17 can harmoniously output sounds in response to the audio signal passed through the one of the light signal limiting unit (right) 10 and the light signal limiting unit (left) 11 in the case that the other one of the light signal receiving unit (right) 8 and the light signal receiving unit (left) 9 receives an infrared signal with sunlight.

Figure 4:
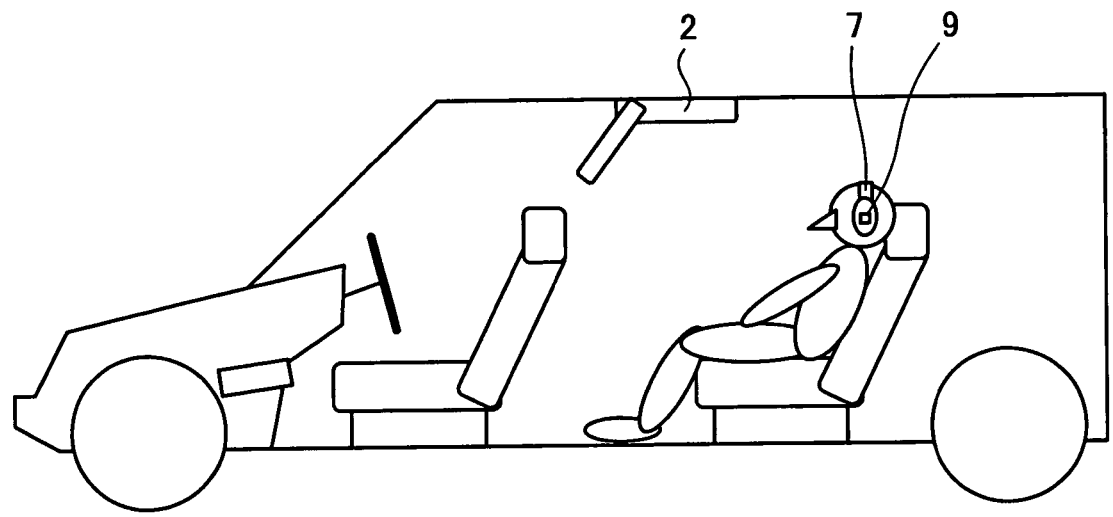
FIG. 4 is a cross-sectional view of the wireless headphone system installed in a vehicle.
Figure 5:
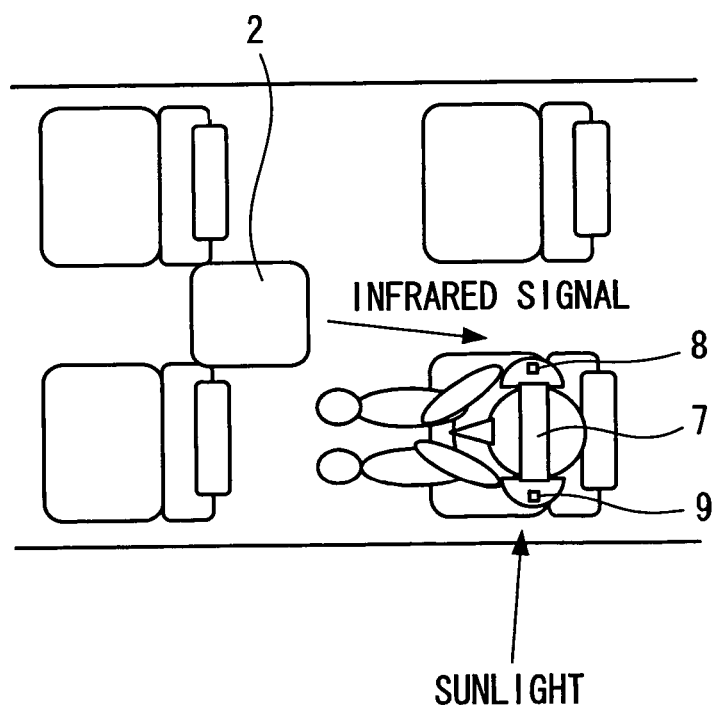
FIG. 5 is a top plan view of the wireless headphone system installed in a vehicle.
Figure 6:
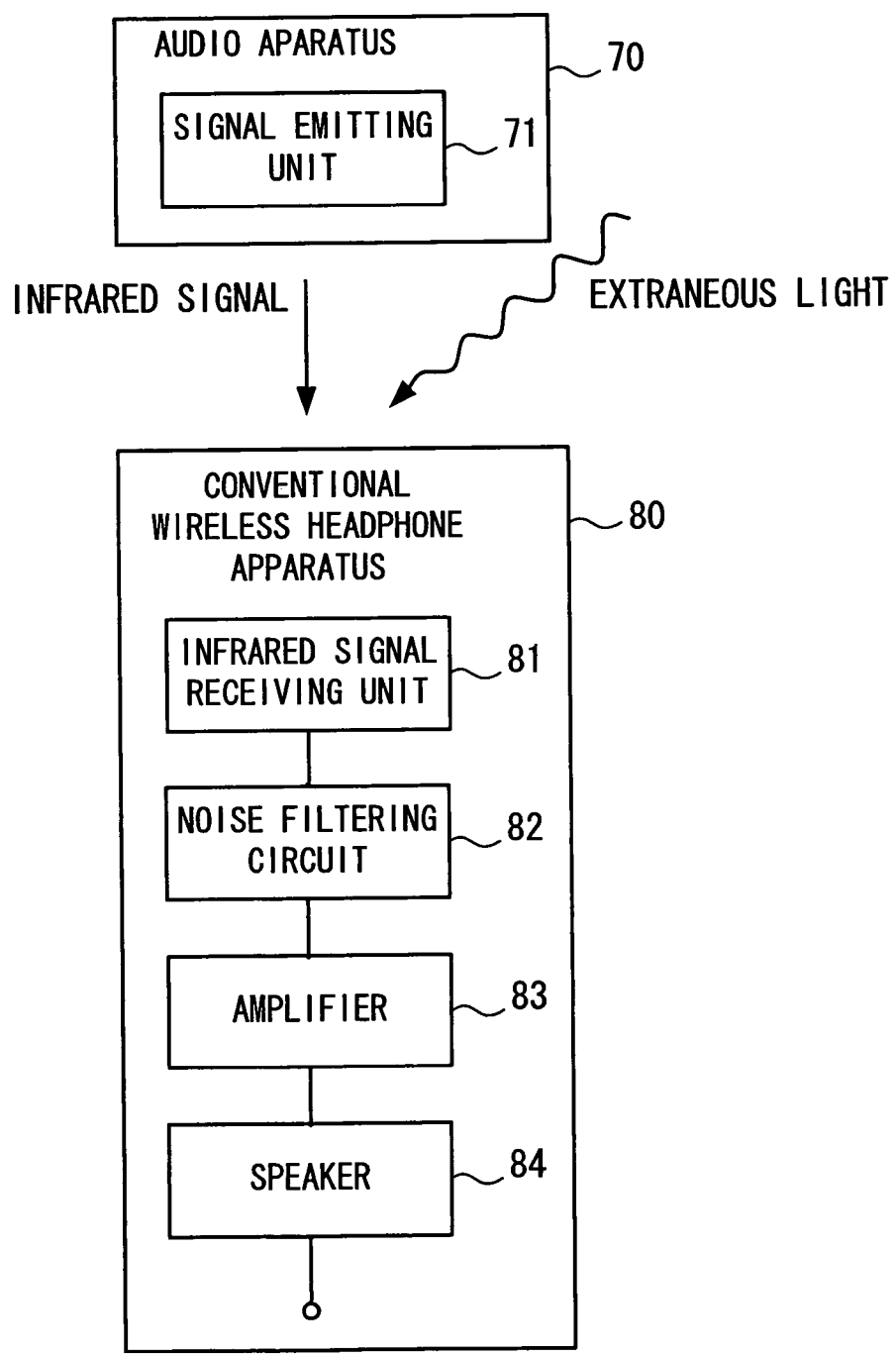
FIG. 6 is a block diagram of a conventional wireless headphone system.

The wireless headphone system 100 installed in a vehicle is shown in FIGS. 4 and 5. FIG. 4 is a cross-sectional view of the wireless headphone system 100 installed in a vehicle. FIG. 5 is a top plan view of the wireless headphone system 100 installed in the vehicle. Although it has been described in the present embodiment that the wireless headphone system 100 is installed in the vehicle, it is needless to mention that the wireless headphone apparatus 100 may be used in any place such as, for example, in the open air. As shown in FIG. 4, the transmitting unit 2 is provided on a ceiling of the vehicle. This leads to the fact that the transmitting unit 2 can efficiently emit a light signal to the wireless headphone apparatus 7 placed in the vehicle. Furthermore, the ceiling of the vehicle blocks the light signal emitted by the transmitting unit 2 from being intermingled with the strong extraneous light such as for example sunlight. Each of the light signal receiving units 8 and 9 of the wireless headphone apparatus 7 is operative to receive the light signals emitted by the light emitting section 5 in the vehicle. As shown in FIG. 5, a passenger is sitting in a left seat and tends to receive sunlight from a left window. This means that the light signal receiving unit 8 placed on the right side receives an infrared signal with less extraneous light while the light signal receiving unit 9 placed on the left side receives an infrared signal with sunlight.

The operation of the wireless headphone system 100 according to the present invention will be described hereinlater with reference to the drawings shown in FIG. 1.

The operating unit is operated by a user to operate the audio unit 6 to have the audio unit 6 play, for example, a CD. The audio unit 6 is operated to play the CD to produce an audio signal. The audio signal produced by the audio unit 6 is inputted to the transmitting unit 2.

In the transmitting unit 2, the stereo signal modulating section 3 is operated to amplify and frequency-modulate the audio signal, and the control section 4 is operated to control the light emitting section 5 to have the light emitting section 5 emit a light signal. Here, the strength of the light signal emitted by the light emitting section 5 is adjusted by the control section 4 in accordance with the audio signal amplified and frequency-modulated by the stereo signal modulating section 3. The light signal emitted from the light emitting section 5 is received by the wireless headphone apparatus 7.

In the wireless headphone apparatus 7, each of the light signal receiving units 8 and 9 is operated to receive the light signal emitted by the light emitting section 5 of the transmitting unit 2 to produce an audio signal having a signal level. The audio signal produced by the light signal receiving unit (right) 8 is inputted to the light signal limiting unit (right) 10, and the audio signal produced by the light signal receiving unit (left) 9 is inputted to the light signal limiting unit (left) 11. Each of the light signal limiting units 10 and 11 is operated to allow only an audio signal having a signal level lower than a predetermined threshold value to pass therethrough and delete an audio signal having a signal level equal to or greater than the predetermined threshold value. The signal synthesizing unit 12 is then operated to synthesize the audio signals passed through the light signal limiting units 10 and 11 to produce a synthesized electric signal. The signal demodulating unit 13 is operated to demodulate the synthesized electric signal produced by the signal synthesizing unit 12.

In the present embodiment, the light signal limiting unit (left) 11 is operated to delete the audio signal having strong noise components caused by the sunlight while the light signal limiting unit (right) 10 is operated to allow the audio signal to pass therethrough, the signal synthesizing unit 12 is operated to output the audio signal passed through the light signal limiting unit 10 as the synthesized audio signal, and the signal demodulating unit 13 is operated to demodulate the audio signal outputted by the signal synthesizing unit 12 under the condition that the light signal receiving unit 9 placed on the left side receives an infrared signal with sunlight while the light signal receiving unit 8 placed on the right side receives the infrared signal with less extraneous light as shown in FIG. 5.

The amplifying unit (right) 14 and the amplifying unit (left) 15 are operated to amplify the audio signal demodulated by the signal demodulating unit 13. The right speaker 16 and the left speaker 17 are operated to output sounds in response to the audio signals respectively amplified by the amplifying unit (right) 14 and the amplifying unit (left) 15.

As will be understood from the foregoing description, it is to be understood that the wireless headphone apparatus 7 according to the present invention, in which one of the light signal limiting units is operative to delete the audio signal having strong noise components while the others of the light signal limiting units is operative to allow the audio signal to pass therethrough, the signal synthesizing unit 12 is operated to synthesize and output the audio signals passed through the others of the light signal limiting units as the synthesized audio signal, and the right speaker 16 and the left speaker 17 are operative to output sounds in response to the audio signal outputted by the signal synthesizing unit 12 in the case that one of the light signal receiving units receives an infrared signal with sunlight, can prevent noises caused by sunlight from being outputted.

While it has been described in the above that the transmitting unit 2 is placed on the ceiling, the transmitting unit 2 may be placed anywhere in the vehicle. The transmitting unit 2 may be placed in, for example, the instrument panel. The audio unit 6 may be integrated with the transmitting unit 2. The audio unit 6 may include a television set.

As will be seen from the above, there has been described only two light signal receiving units 8 and 9 placed in the vicinity of the right speaker 16 and the left speaker 17 in the previous embodiment for the purpose of simplifying the description and assisting in understanding about the whole operation of the wireless headphone apparatus 7. According to the present invention, the wireless headphone apparatus 7 may comprise any number of light signal receiving units in various manners as long as the wireless headphone apparatus 7 comprises the same number of light signal limiting units respectively connected with the light signal receiving units in one to one relationship as described hereinlater.

Figure 3:
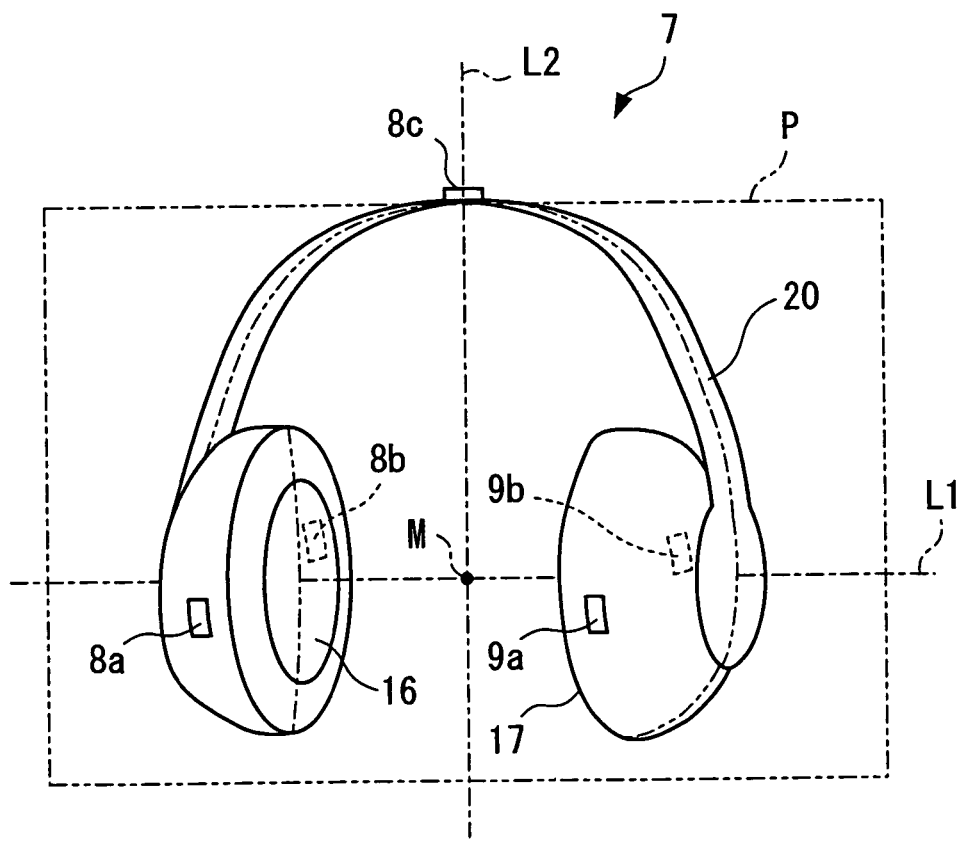
FIG. 3 is a perspective view similar to FIG. 2, but showing that the light signal receiving units are placed in a headphone housing.

As shown in FIG. 3, the speaker means is further constituted by a housing 20 for accommodating the right speaker 16 and the left speaker 17 and having a first axis L1 passing through the right speaker 16 and the left speaker 17. The wireless headphone apparatus 7 may further comprise at least one light signal receiving unit 8c mounted on the housing 20 and placed on a second axis L2 substantially perpendicular to the first axis L1 and passing through a middle point M of the first axis L1 in equidistantly spaced relationship with the right speaker 16 and the left speaker 17. In the wireless headphone apparatus 7 thus constructed, the light signal receiving unit 8c mounted on the housing 20 and placed on a second axis L2 substantially perpendicular to the first axis L1 and passing through a middle point M of the first axis L1 in equidistantly spaced relationship with the right speaker 16 and the left speaker 17, can receive the infrared signal with less interferences because of the fact that the light signal receiving unit 8c is placed in the vicinity of a ceiling of the vehicle, which blocks the light signal receiving unit 8c from being exposed to the strong extraneous light such as for example sunlight.

Furthermore, the wireless headphone apparatus 7 may further comprise light signal receiving units 8a and 8b and/or light signal receiving units 9a and 9b respectively opposing to each other across a plane P passing through the first axis L1 and the second axis L2. In the wireless headphone apparatus 7 thus constructed, one of the light signal receiving units 8a and 8b and/or one of the light signal receiving units 9a and 9b can receive the infrared signal with less interferences in the case that the other one of the light signal receiving units 8a and 8b and/or one of the light signal receiving units 9a and 9b are exposed to the strong extraneous light such as for example sunlight coming through a front window or a rear window of the vehicle.

While the subject invention has been described with relation to the preferred embodiment, various modifications and adaptations thereof will now be apparent to those skilled in the art as far as such modifications and adaptations fall within the scope of the appended claims intended to be covered thereby.

What is claimed is:

1. A wireless headphone apparatus, comprising:
    a plurality of light signal receiving units, each for receiving a light signal to produce an electric signal having a signal level;
    a plurality of light signal limiting units respectively connected with said plurality of light signal receiving units in one to one relationship, each of said light signal limiting units operative to allow only an electric signal having a signal level lower than a predetermined threshold value to pass therethrough and delete an electric signal having a signal level equal to or greater than said predetermined threshold value;
    a signal synthesizing unit for synthesizing said electric signals passed through said light signal limiting units to produce a synthesized electric signal; and
    speaker means for outputting a sound in response to said synthesized electric signal.

2. A wireless headphone apparatus as set forth in claim 1, in which
    said light signal receiving units are constituted by at least two light signal receiving units.

3. A wireless headphone apparatus as set forth in claim 1, in which
    said speaker means is constituted by a right speaker and a left speaker.

4. A wireless headphone apparatus as set forth in claim 3, in which
    said light signal receiving units are placed in the vicinity of said right speaker and said left speaker.

5. A wireless headphone apparatus as set forth in claim 1, in which
    speaker means is further constituted by a right speaker, a left speaker, and a housing having a first axis passing through said right speaker and said left speaker,
    at least one of said light signal receiving units is placed on a second axis substantially perpendicular to said first axis and passing through a middle point of said first axis in equidistantly spaced relationship with said right speaker and said left speaker.

6. A wireless headphone apparatus as set forth in claim 1, in which
    said speaker means is further constituted by a right speaker, a left speaker, and a housing having a first axis passing through said right speaker and said left speaker, and a second axis substantially perpendicular to said first axis and passing through a middle point of said first axis in equidistantly spaced relationship with said right speaker and said left speaker,
    said light signal receiving units are opposing to each other across a plane passing through said first axis and said second axis.

7. A wireless headphone system, comprising:
    a light signal emitting apparatus for emitting a light signal; and
    a wireless headphone apparatus as set forth in any one of claims 1 to 6, and in which
    each of said plurality of light signal receiving units of said wireless headphone apparatus is operative to receive said light signal emitted by said light signal emitting apparatus.

8. A wireless headphone system as set forth in claim 7, in which
    said light signal emitting apparatus is provided in a vehicle, and
    each of said light signal receiving units of said wireless headphone apparatus is operative to receive said light signal emitted by said light signal emitting apparatus in the vehicle.

9. A wireless headphone system as set forth in claim 8, in which
    said light signal emitting apparatus is provided on a ceiling of the vehicle.

* * * * *